(12) United States Patent
Boutaghou et al.

(10) Patent No.: US 8,379,348 B2
(45) Date of Patent: Feb. 19, 2013

(54) FLY CAPABLE SLIDER TEST SOCKET

(75) Inventors: Zine-Eddine Boutaghou, Fremont, MN (US); Peter Crane, Fremont, CA (US); Peter R. Goglia, Fremont, CA (US)

(73) Assignee: Xyratex Technology Limited (GB)

( * ) Notice: Subject to any disclaimer, the term of this patent is extended or adjusted under 35 U.S.C. 154(b) by 182 days.

(21) Appl. No.: 12/938,055

(22) Filed: Nov. 2, 2010

(65) Prior Publication Data
US 2012/0008225 A1    Jan. 12, 2012

Related U.S. Application Data

(60) Provisional application No. 61/363,537, filed on Jul. 12, 2010.

(51) Int. Cl.
*G11B 5/48* (2006.01)
(52) U.S. Cl. .......................................... 360/240
(58) Field of Classification Search .................. 360/240, 360/86, 234.3, 125.01
See application file for complete search history.

(56) References Cited

U.S. PATENT DOCUMENTS

| | | | |
|---|---|---|---|
| 6,459,260 B1 | 10/2002 | Bonin et al. | |
| 8,169,731 B2 * | 5/2012 | Mizuno et al. | 360/59 |
| 2004/0056650 A1 | 3/2004 | Boutaghou et al. | |
| 2009/0146653 A1 | 6/2009 | Kainuma et al. | |
| 2009/0251825 A1 | 10/2009 | Honzawa et al. | |
| 2012/0033318 A1 * | 2/2012 | Boutaghou et al. | 360/31 |

OTHER PUBLICATIONS

International Search Report (PCT/US2011/042424), dated Dec. 26, 2011.

* cited by examiner

*Primary Examiner* — Allen Cao
(74) *Attorney, Agent, or Firm* — Womble Carlyle Sandridge & Rice, LLP

(57) ABSTRACT

The present application is directed to a slider supporting apparatus for flying a slider of a hard disk drive in the manufacturing process to provide electrical performance characteristics. The present invention discloses an integrated design including the electrical interconnect, the gimballing mechanism, the preload mechanism and the slider supporting mechanism integrated into a single supporting structure.

25 Claims, 24 Drawing Sheets

FLY CAPABLE SLIDER TEST SOCKET

CLAIM OF PRIORITY

This application claims the benefits of the filing date of U.S. Provisional Patent Application Ser. No. 61/363,537 filed Jul. 12, 2010 entitled, "Fly Capable Slider Clamp Assembly" which is hereby incorporated herein in its entirety by reference for all purposes.

BACKGROUND

The present application is directed to a fly capable clamp assembly for testing magnetic recording of a substrate, and a method of making and using the same. The present method permits mechanical fly and magnetic testing of magnetic sliders used in the hard disk drive industry. This invention relates to a slider supporting apparatus for flying a slider of a hard disk drive in the manufacturing process to provide electrical performance characteristics.

A disk drive head gimbal assembly (HGA) with a magnetic head is used to write and read data to and from a disk drive. Conventional magnetic heads (also referred to as sliders) are mounted on suspensions as they are tested for read/write performance during the manufacturing process by enabling the tester to fly the slider, set the head media spacing and test for magnetic performance of writer and reader elements. A slider tester is used to characterize the performance of the HGA. The sliders which are found to be non-defective as a result of the checks are incorporated into the disk drive manufacturing. The sliders found non-functional are rejected. The rejected sliders may require either disposing of the non-functional HGAs or reworking by removing the sliders and recycling the suspensions. The slider removal/reworking operation causes suspension damage, as well as pitch and roll static deformation.

Accordingly, slider testers have been developed that can inspect each individual slider. In a conventional slider tester described in U.S. Pat. No. 6,943,971 B2, depicted in FIG. 1, sliders are supported so as to mimic the suspension. A recording medium such as a magnetic disk is rotated to provide an air bearing surface to the slider to provide the proper head media spacing so as to perform write and read operations. A tester for measuring the performance of the slider without permanent assembly of the slider to the suspension is advantageous in cost. The tester is capable of simulating approximate conditions of the slider. However, with the advent of dynamic fly height adjust, a contact detection operation is performed to set the proper clearance between the magnetic medium and the write and read sensors.

Consequently, slider supporting apparatuses have been developed that have a load beam and flexure constructed in the same manner as those of actual suspensions, which can be removably fitted with a slider. One such slider supporting apparatus is described in US 2006/0236527 A1 and 2007/0263325 A1. FIGS. 2 and 3 depict a head gimbal assembly for removably testing sliders. As shown in FIG. 2, this conventional slider supporting apparatus includes a portion including a tongue, a pair of bellows portions functioning as springs, a first support portion, and a second portion, etc., which constitute a part of the flexure. Each bellows portion has a top and bottom that are formed by plastic deformation. This formation may be achieved by corrugating a part of the flexure in its thickness direction like waves. The slider is placed on the tongue with the bellows portions stretched in the direction of arrow T by means of a jig not shown. Thereafter, the bellows are released from the applied tension, whereupon the slider is clamped between the bellows springs and the support. To increase the stroke of the bellows structure, the number of bellows may be increased. The length of the spring structure cannot be increased and is limited by the size of the slider structure. The bellows apply an undesirable out of plane moment tending to pop the slider out of the tongue due to manufacturing tolerances during the plastic forming of the bellows. The moment can also contribute to generating pitch and roll static torque contributing to load and unload magnetic media damage and slider media contact during the slider testing.

FIG. 3, from US Patent Publication No. 2006/0236527 A1 shows a portion of the load beam formed to provide a rigid tab perpendicular to a support at the leading edge of the slider. A second forming operation of a flexible tab at the trailing edge on the support is performed. The flexible tab deforms to provide an opening for inserting the slider into the tongue formed into the support. The flexible tab produces a holding force to secure the slider during the loading and unloading onto the magnetic media. The rigid tab can be configured to provide an electrical interconnection between the slider and the electrical interconnect. The embodiment of FIG. 3 suffers from the same problems noted above with regard to FIG. 2.

Another proposed solution from U.S. Pat. No. 6,943,971 B2 shown in FIG. 4 provides a slider supporting apparatus provided with a flexure formed of a metal plate having spring characteristics, the flexure includes a portion having a first tongue, a second support portion including a second tongue for supporting the slider. The spring portion is composed of a pair of flat springs each including a plurality of alternate convexes and concaves formed along the side of the first tongue and configured to extend to a length which allows the slider to be inserted between the first and second support portions when subjected to a tensile load. This zigzag design offers the benefit of increasing the stroke of the spring while limiting permanent deformations. The alternating concaves and convexes provide a low out of plane stiffness and a large exposed real estate area susceptible to windage excitation during the loading onto a rotating magnetic medium during slider tester. Windage excitations cause out of plane excitations imparted to the slider during write read operation leading to off track motions. This design presents limitations in increasing the frequency response of the system leading to a reduction in the number of zigzags which in turns limits the stroke of the design.

A slider suspension assembly for a slider tester is provided which includes another mechanism from U.S. Pat. No. 6,459,260 as shown in FIG. 5. The assembly includes an electrical interconnect, such as a flex circuit. The socket is adapted to secure a slider and electrically couple the interconnect to the slider. The socket includes elements tightly spaced to secure the slider in the socket opening. A clamp bar is urged against slider with the assistance of beam springs that extend longitudinally with respect to slider. After the slider is placed between the clamp bar and interconnects, the slider is firmly supported. Longitudinal springs attached to the clamp bar urge the slider to be biased against the electrical contacts. A large number of beam springs are adapted to increase the load applied to secure the slider in place. Minimizing the stress at the beams has lead to designing long tapered beams at the leading and trailing edge of the slider resulting in a substantially large design that adds excessive mass at the suspension end. This mass increase reduces the frequency response of the head assembly and induces an increase of load/unload contact probability, which in turn causes frequency response deterioration.

It is within this context that the present embodiments arise.

SUMMARY OF THE INVENTION

The present application is directed to a slider supporting apparatus for flying a slider of a hard disk drive in the manufacturing process to provide electrical performance characteristics. The present invention discloses an integrated design including the electrical interconnect, the gimballing mechanism, the preload mechanism and the slider supporting mechanism integrated into a single supporting structure.

A slider socket apparatus is provided with a flexure formed of a metal plate having spring characteristics. The flexure comprises a first portion including a clamp formed with a closed curved beam to secure the slider to the socket, a second portion including a flat holder plate to support the slider against the socket, a third portion including a guide to bias the slider against an interconnect flexure, a fourth portion including an interconnect arrangement with two fixed points and a series of flexible camel shaped electrical contacts, a fifth portion including a gimbal mechanism providing pitch and roll stiffness to the socket, and a sixth portion transferring a preload mechanism onto a formed dimple against the socket via a preload stem. The closed curved spring provides a biasing force to secure the slider into the flat holder plate, and is designed to deform elastically to provide a force to secure the slider into the socket. The closed curve spring surrounds an outer periphery of at least three edges of the slider in one embodiment. In another embodiment, the closed curve spring has a single curve in a relaxed position. In yet another embodiment, the closed curve spring may include a plurality of closed curve springs in a stacked configuration.

One embodiment is directed to a method of making a slider holding assembly referred to as slider socket including a series of curved springs arranged in a closed form to provide a preload applied onto the leading edge of the slider secured into a cavity fabricated into the slider socket. The curved spring structure forms a membrane force applying a holding force onto the leading edge of the slider. The trailing edge of the slider contacts a series of interconnect springs to provide electrical contact. Two rigid interconnects are arranged at the far ends of the slider to provide a datum. A series of flexible interconnects arranged between the two rigid interconnects deform under the load applied by the closed curved springs onto the slider to provide reliable electrical contact between the slider and the fly capable slider assembly. The slider test socket with the electrical interconnects is mounted onto a gimballing and preload assembly. The gimbal assembly applies a preload through a formed dimple to the slider test socket. The gimbal provides both roll and pitch stiffness to permit the slider test socket to comply to the media. A preload stem is attached to a curvilinear spring structure applying a preload to the slider test socket through the formed dimple. The curvilinear spring arrangement provides minimum rotation under normal deflections to prevent rotation of the slider test socket during electrical test verification.

In another embodiment a slider test socket with closed curved springs with electrical interconnects is attached to a traditional suspension. The test socket is attached to the gimbal of the suspension. The gimbal attachment includes an interconnect mating the socket flexible interconnect to establish electrical connections. The suspension provides the gimbal attachment and a preload through a preload bend.

Another embodiment is directed to a method of making an electrical test socket including the steps of fabricating wafer-like layers of various components, aligning the layers, and attaching the layers. The layers are initially patterned and etched to form the various functional layers including the spring structures and the slider pocket layer, and other spacer layers. Alignment features are fabricated on each layer to orient and maintain the required tolerances prior to final assembly.

Another embodiment is directed to a method of making the flexible electrical contacts to deform in the same direction as the applied load transferred by the slider onto the electrical contact to reduce the likelihood of scratching of the slider electrical connections plated with soft gold inherently sensitive to damage. The flexible electrical contacts are plated with 1-2 microns of hard gold to enhance the electrical contact.

Another embodiment is directed to a method of making the flexible electrical contacts to deform in a direction different than the applied load to promote scratching of the slider electrical connections plated with soft gold. The flexible electrical contacts are plated with 1-2 microns of hard gold to enhance the electrical contact. As an alternative to the gold, a palladium cobalt or palladium nickel coating may be used in another embodiment.

Another embodiment is directed to a method of the flexure with a flexible hinge connecting two curved beams. The flexible hinge changes the boundary conditions a the end of the curved beams by allowing a rotational movement of the flexures which in turn reduces the maximum stress compared to a curved beam with the same radius of curvature.

Another embodiment is directed to an assembly for a slider tester having a socket coupled to a gimbal assembly. The socket is configured to releasably secure a slider through a closed curved beam extending around a periphery of a side of a socket pocket configured to support the slider. One end of the closed curved beam is coupled to a first end of an elastic hinge. A second end of the elastic hinge is coupled to a first end of a secondary curved beam. A second end of the closed curved beam is affixed to an extension, wherein the elastic hinge decouples motion of the closed curved beam and the secondary curved beam.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

The embodiments described herein provide a method and apparatus for testing a slider. It will be apparent to one skilled in the art, that the present invention may be practiced without some or all of these specific details. In other instances, well known process operations have not been described in detail in order not to unnecessarily obscure the present invention.

Figure 6:
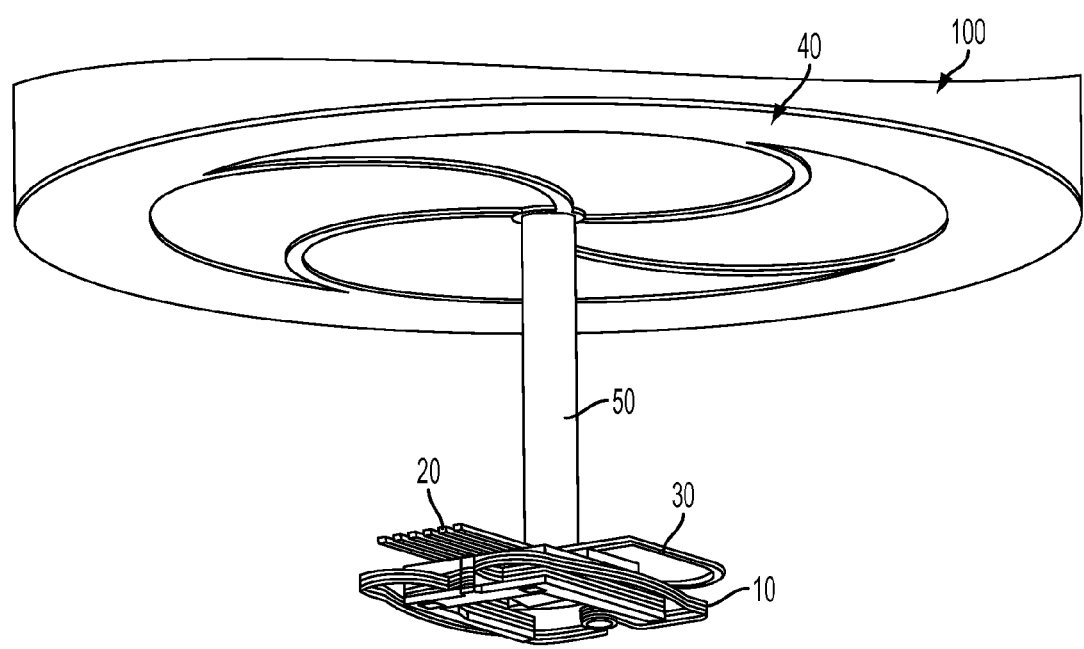
FIG. 6 is a schematic view of a flying slider test socket in accordance with an embodiment of the present invention.

FIG. 6 illustrates a fly capable slider test socket 100 with various components described in more detail below. A slider test socket 10 is attached to a gimbal structure 30. A center region of the gimbal structure 30 is in turn attached to a preload stem 50, which in turn is connected to a flexible preload spring 40. Flexible preload spring 40 may also be referred to as a flexible preload flexure. Flexible preload spring 40 has a plurality of curvilinear springs extending radially from an inner peripheral surface of an outer circular region of the preload spring to an outer peripheral surface of an inner circular region of the preload spring. It should be appreciated that curvilinear springs deflect in the direction of the load and do not twist. In addition, preload spring 40 has a much higher resonant frequency than any of the mentioned prior art embodiments, as the preload spring is located further from the disk, as compared to the prior art so as not to be effected by the vibration and wind generated from the rotation of the disk. In addition, stem 50 is less susceptible to be excited by wind and vibration due to this configuration. Accordingly, the torsion and sway modes for the embodiments described herein are substantially reduced as compared to the prior art mechanisms. A flexible electrical interconnect 20 is attached to the slider test socket 10 to provide an electrical connection in accordance with one embodiment of the present invention. Further details of each of the components described above are provided below.

Figure 7:
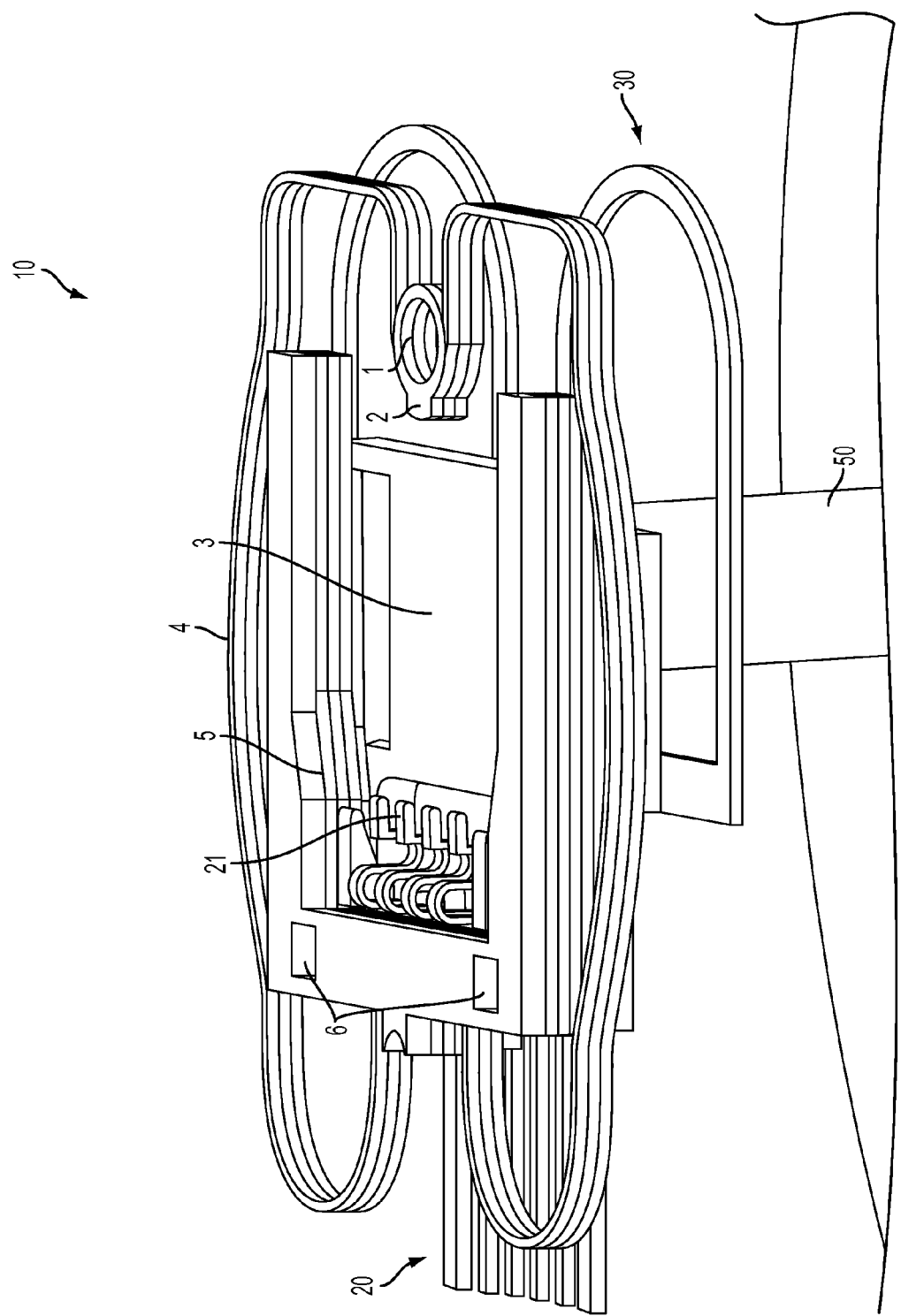
FIG. 7 is a detailed view of an assembled slider test socket in accordance with an embodiment of the present invention.

FIG. 7 details the components of the slider test socket 10 in accordance with one embodiment of the invention. A series of closed curved beams 4 are assembled in a stacked configuration to open and close in unison under a preload applied by constraining the openings 6 and applying a load through opening 1. One skilled in the art will appreciate that a tool may be utilized to perform the placement of the slider into the slider test socket 10 by creating an opening to place the slider into the test socket. In one embodiment, multiple curved beams are stacked over each other as illustrated in FIG. 7. In an alternative embodiment, a single curved beam may be utilized rather than multiple curved beams. The radius of curvature of beams 4 at the middle portion of the beams is correlated to the displacement force relationship. An extension 2 fabricated on one end of the closed curved beams 4 provides a contacting force with the leading edge of the slider to hold the slider from falling off the socket pocket 3. During the insertion of the slider into the slider test socket 10, the curved beams 4 are extended to move the contacting feature 2 to provide enough clearance for the insertion of the slider into socket pocket 3. Features fabricated into guide pocket 5 provide a datum to guide the slider to ensure contact with the flexible electrical interconnects 21, so that the bond pads on a surface of the slider contact the flexible interconnects 21. It should be appreciated that the preload force provided against the leading edge of the slider through extension 2 and the deformed curved beams 4 are larger than the forces required to deform the flexible interconnects 21. Upon overcoming the resistance from the flexible interconnects 21, the slider encounters two fixed rigid interconnects located at each end of the of the interconnect assembly 20. An opposing surface of socket pocket 3 of the slider test socket 10 is attached to a gimbal structure 30. A preload force is provided through stem 50, which is attached to the gimbal structure 30 as illustrated with regard to FIG. 6. It should be appreciated that the embodiments described herein provide for a very high out of plane stiffness as compared to the prior art mechanisms so that vibrations and any play in the spindle rotating the disk are much more easily accommodated through the present embodiments.

Figure 8A:
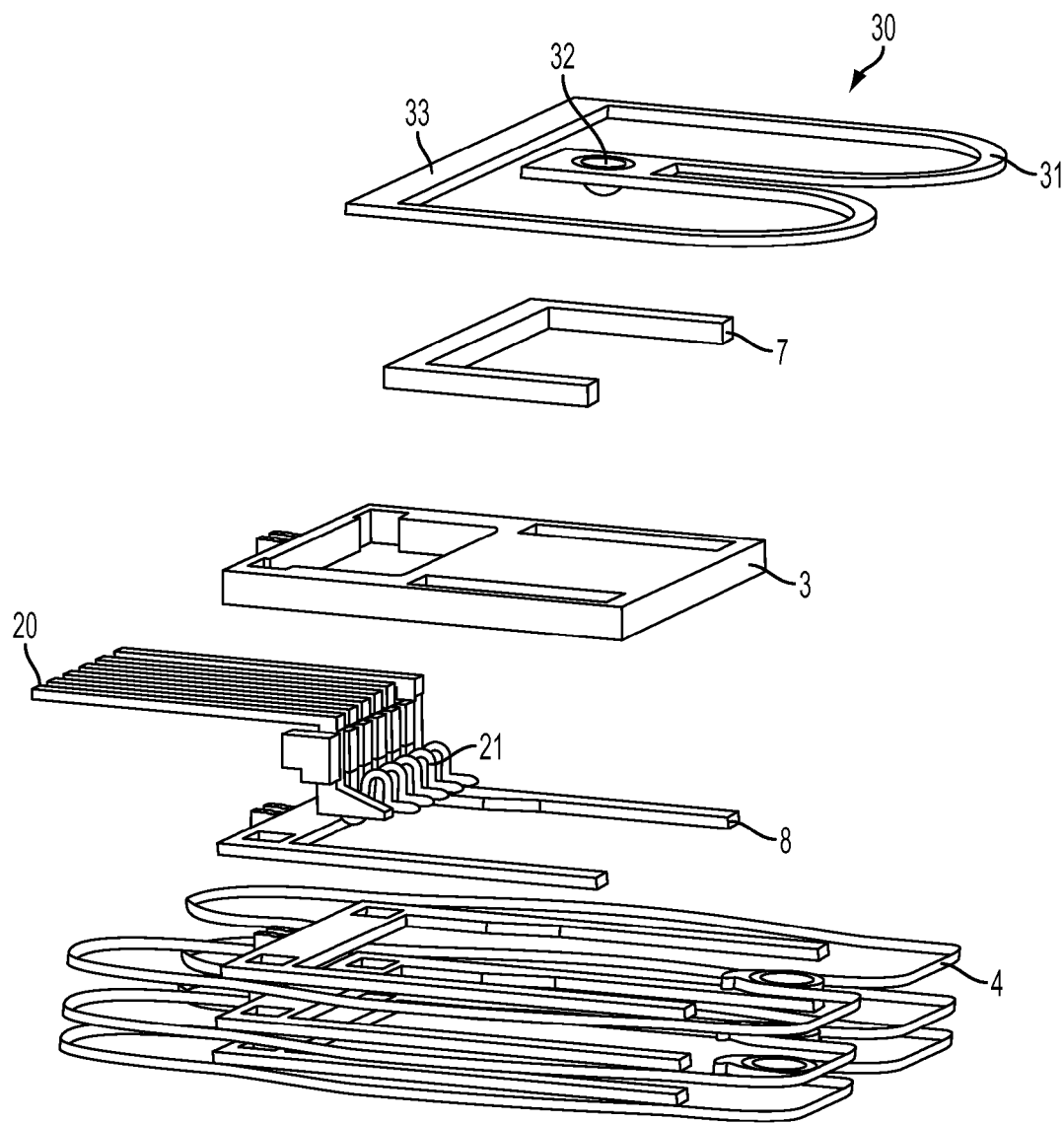
FIG. 8A is an exploded view of the slider test socket with the electrical interconnect and the gimbal in accordance with an embodiment of the present invention.

FIG. 8A provides an exploded view of the test socket assembly in accordance with one embodiment of the invention. A series of closed curved beams 4 stacked over each other are shown attached to a surface of an intermediary layer 8 disposed between the curved beam assembly and the socket pocket 3. A spacer 7 provides the required clearance for the gimbal 30 and the rigid section 33 of the gimbal structure 30 attaches to a corresponding section of spacer 7. A dimple 32 transfers the load from the preload stem to the back surface of the socket pocket 3 of the test socket assembly. Dimple 32 is defined on a planar surface extending from gimbal struts 31 that extend from rigid affixed section 33. In one embodiment, the extension of dimple 32 from the planar surface of gimbal struts 31 is equal to a thickness of spacer 7. One skilled in the art will appreciate that gimbal struts 31 couple to the motion of the disk. An interconnect 20 providing an electrical connection between the bond pads of the slider and traces leading to a testing unit is assembled separately and attached to the test socket assembly.

Figure 8B:
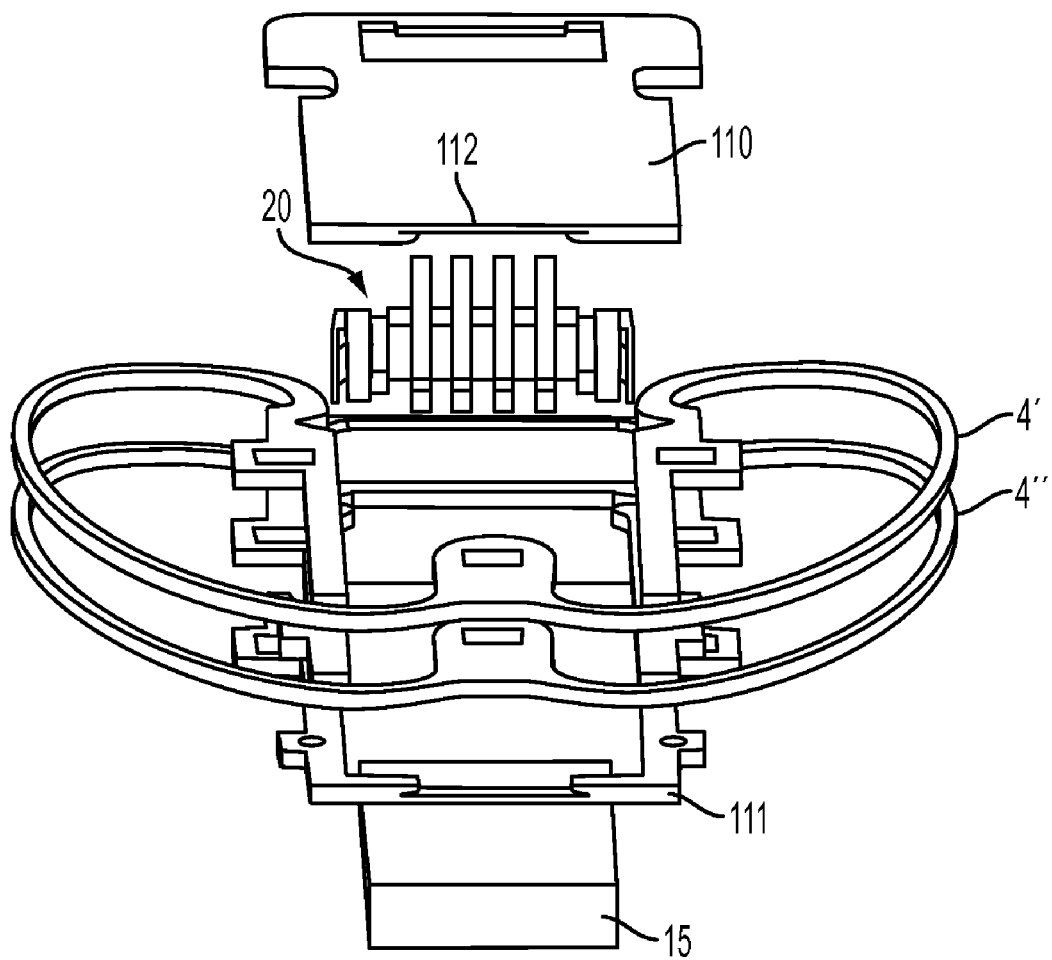
FIG. 8B is an exploded view of the slider test socket with the electrical interconnect in accordance with an embodiment of the present invention.

In another embodiment, FIG. 8B provides an exploded view of the test socket assembly with top plate 110 and bottom plate 111 sandwiching the closed curved spring beams 4', 4" and a portion the electrical interconnect 20. Slider 15 is contained in the cavity formed by the curved beams 4' and 4". The sandwiching of the curved beams 4' and 4" prevents the curved beams from deforming out of plane in this embodiment, i.e., the spring or curved beams move freely in only one direction. Thus, the embodiment of FIG. 8B provides a limit on the amount of extension or deformation of curved beams 4' and 4" in this embodiment. Edge 112 defined on the side surface of top 110 mates with a corresponding edge in bottom 111 to define a gap through which the contacting feature fits. In another embodiment, the edge 112 limits or governs the movement of curved beams 4' and 4".

Figure 1:
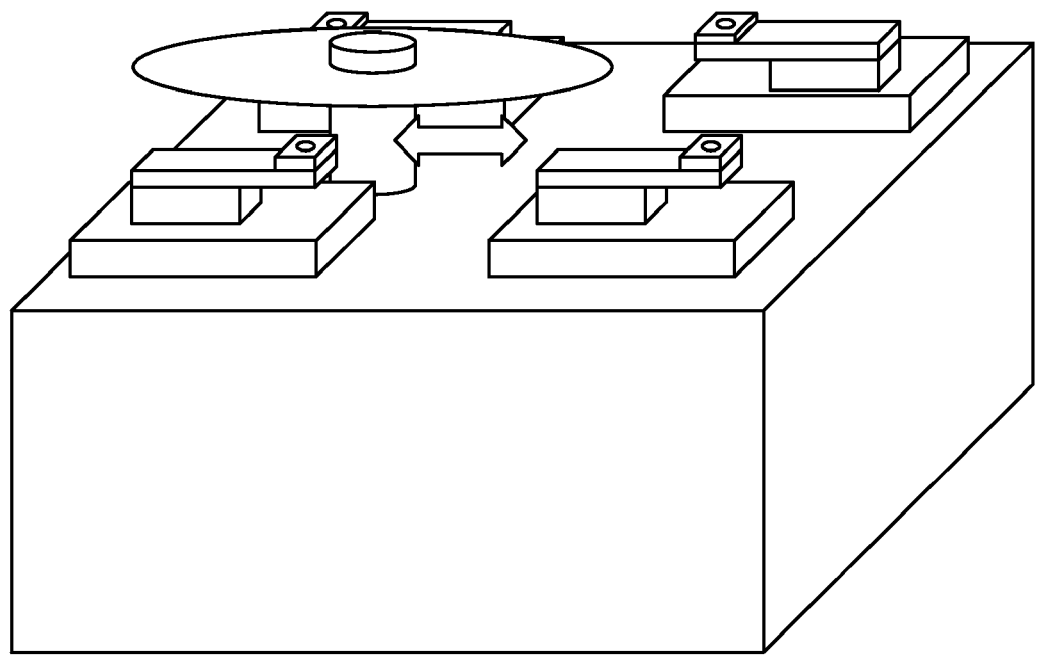
FIG. 1 is a schematic view of a prior art slider test apparatus.
Figure 2:
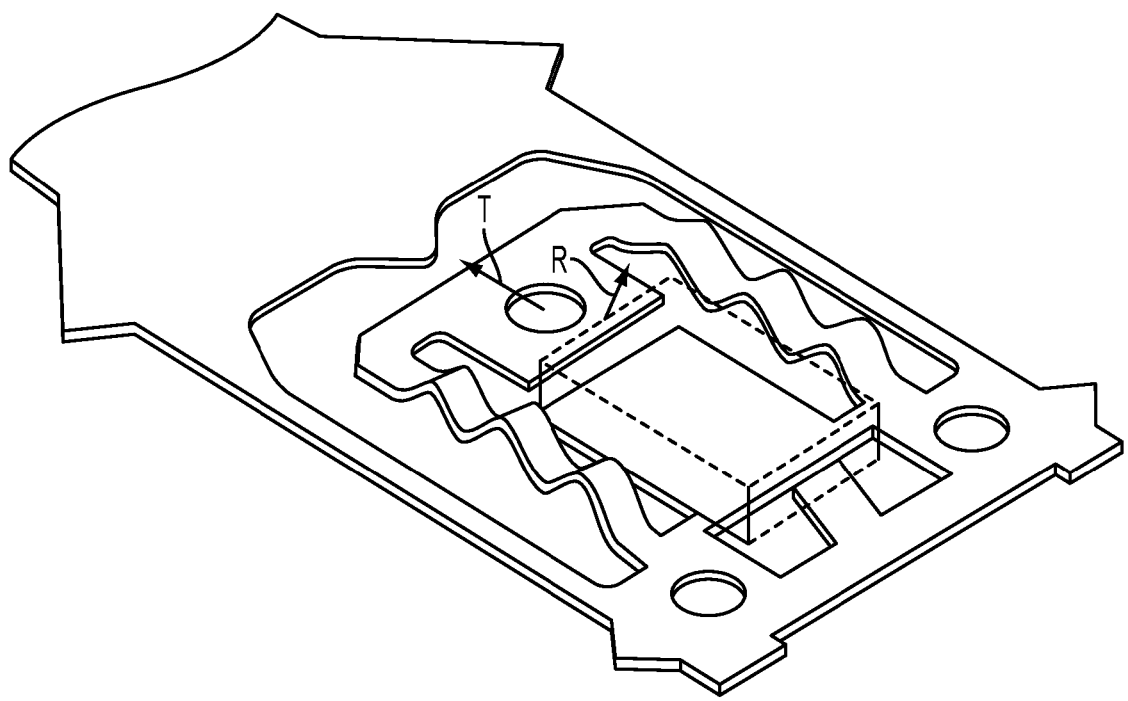
FIG. 2 is a schematic view of a prior art slider test socket.
Figure 3:
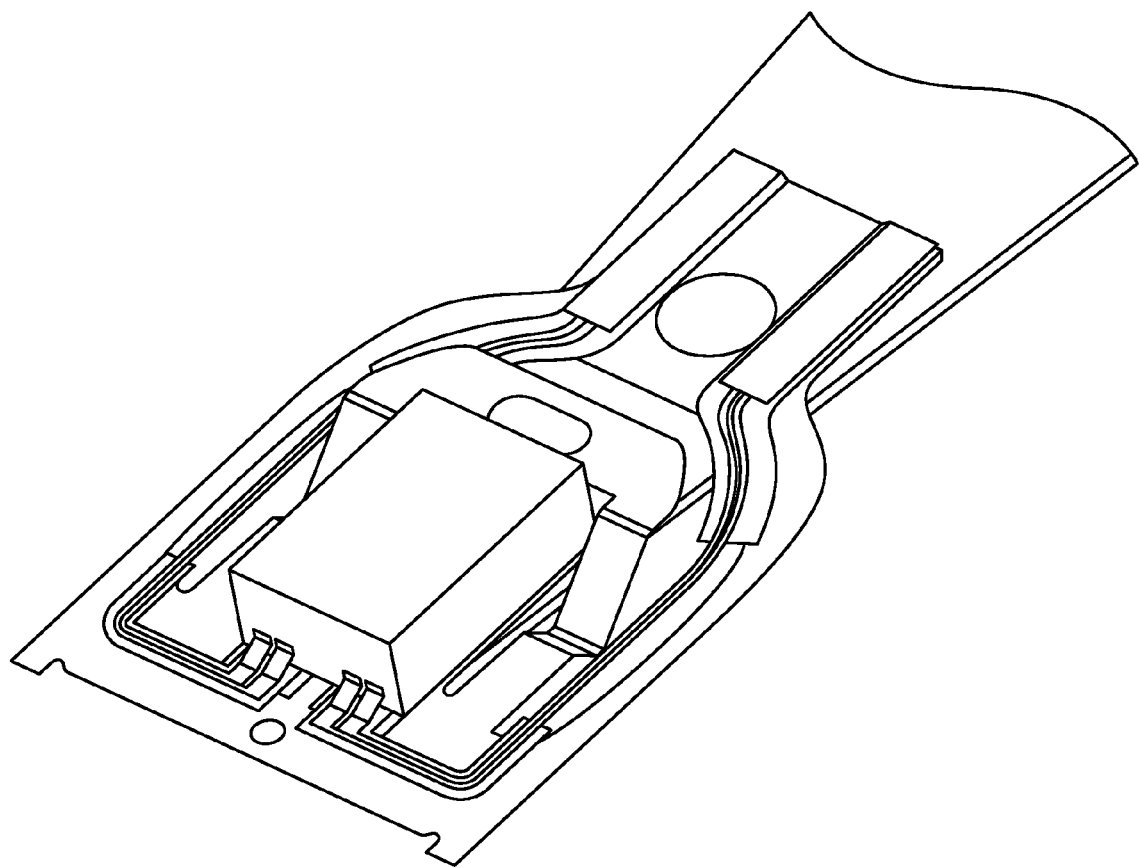
FIG. 3 is a schematic view of a prior art slider test socket.
Figure 4:
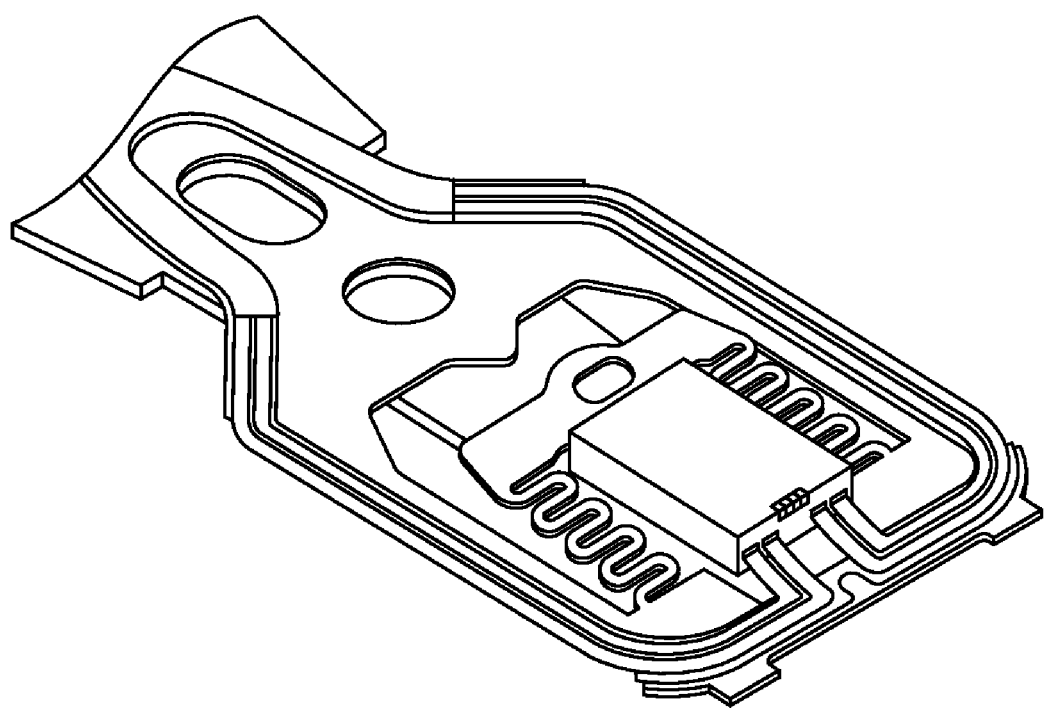
FIG. 4 is a schematic view of a prior art slider test socket.
Figure 5:
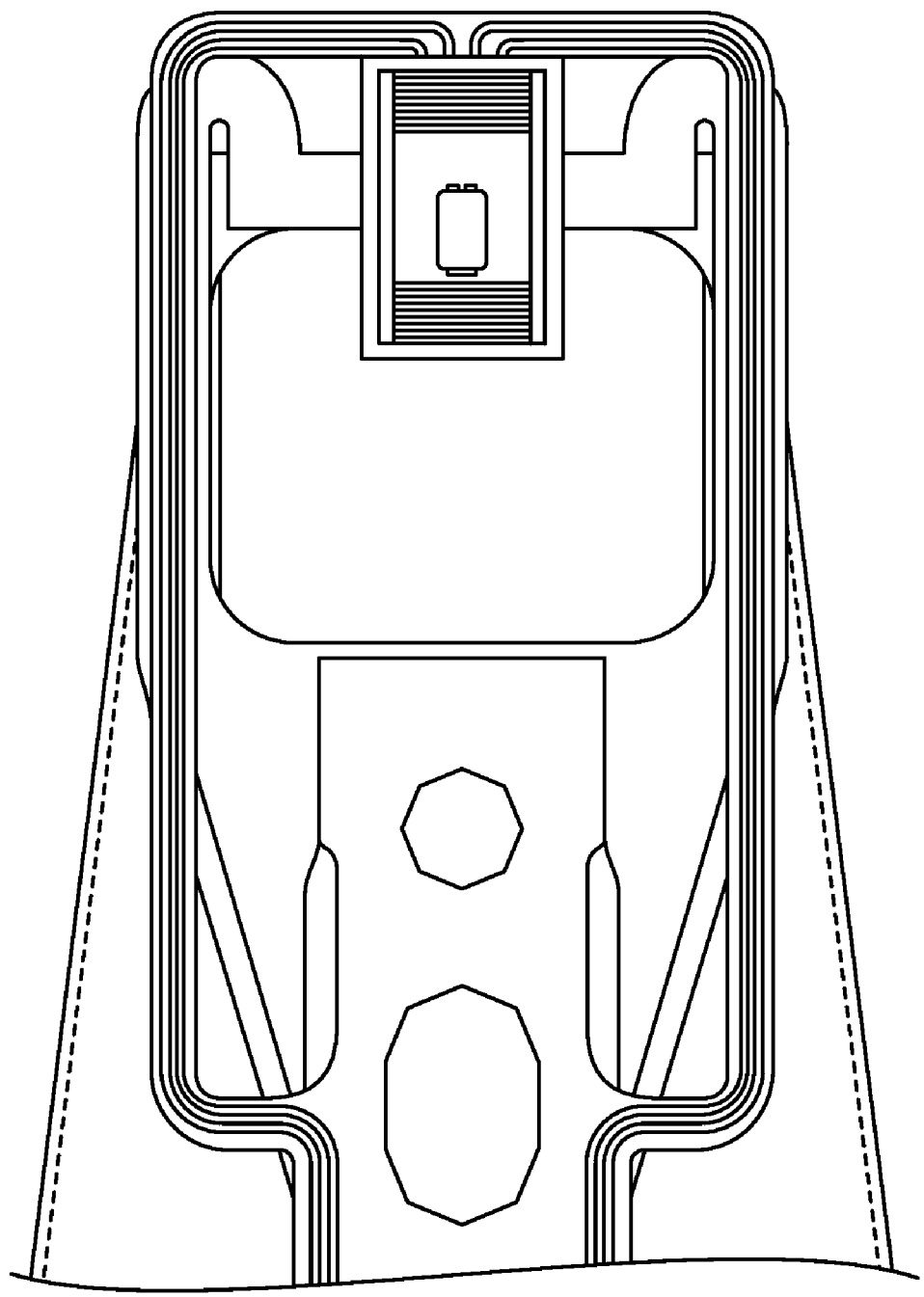
FIG. 5 is a schematic view of a prior art slider test socket.
Figure 9A:
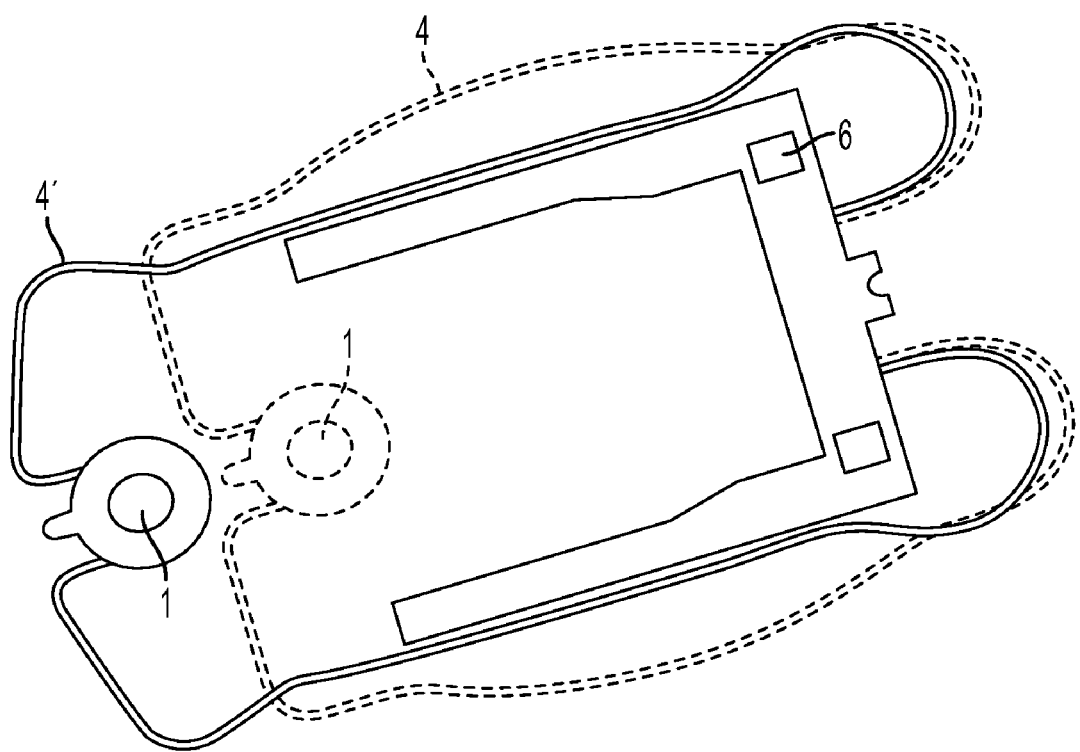
FIG. 9A is a top view of a curved spring providing preload to the slider under zero load and under maximum deflection in accordance with an embodiment of the present invention.

FIG. 9A provides a finite element analysis showing the static and deformed positions of a curved closed beam 4 under fixed boundary conditions provided by openings 6. The load is applied via a pin to opening 1 of the contact feature fabricated onto the spring layer. It should be appreciated that the curved beam 4 is designed to substantially flatten under an externally applied load as illustrated by curved beam 4'. The curved configuration is suitable for large deflections while producing minimal stress on the structure. The prior art embodiments as shown in FIGS. 2 and 4 required a large number of corrugations or zigzags to provide a large extension under an external load. Such corrugations or zigzags features weaken the structure in the out of plane motion and cause poor dynamic performance and tendency to release the slider during load and unload. The continuous curved beams 4 of the present embodiments provide a variable stiffness. The low stiffness is desired during the opening of the clamp and as the clamp opens, the curvature of the beams is reduced to become straight causing a very large resistance in a self limiting case. The tradeoff between the lateral compliance of the curved beams 4 and the out of plane motion is minimal, as contrasted to the prior art embodiments, leading to superior load and unload performance.

Figure 9B:
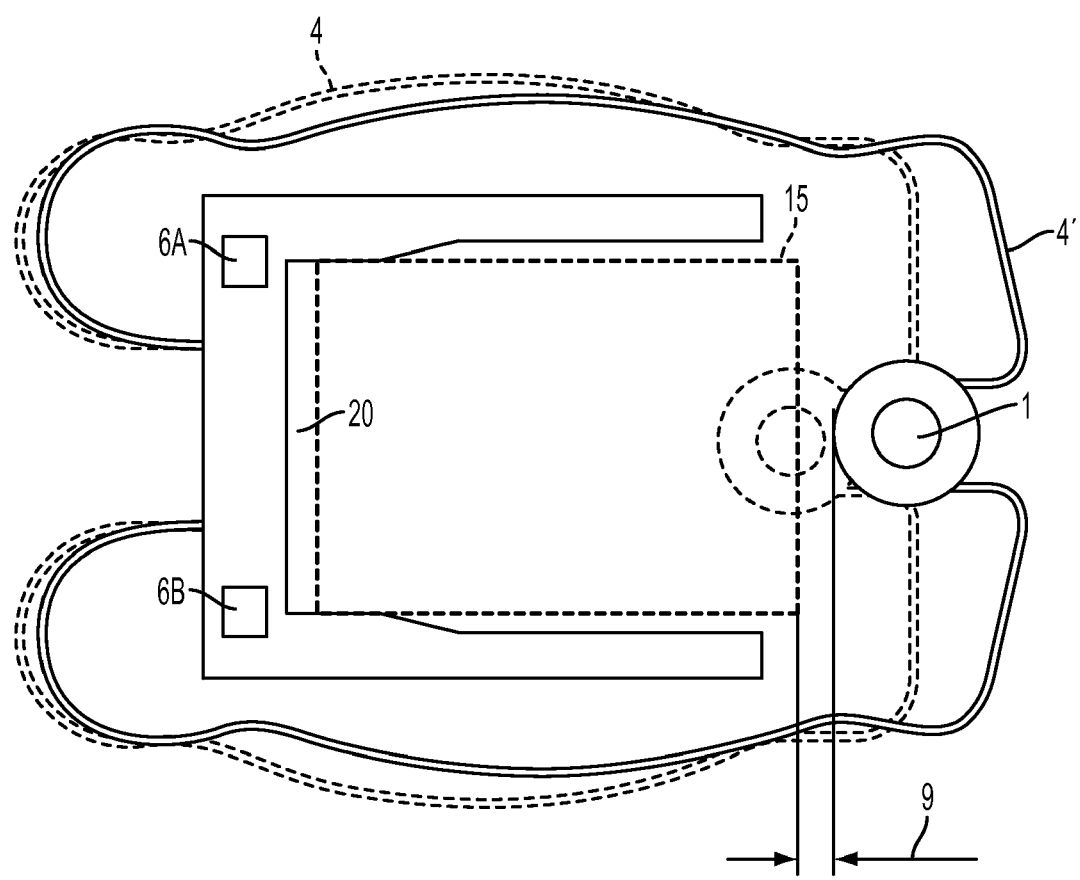
FIG. 9B is a top view of a curved spring providing preload to the slider under zero load and under maximum deflection in accordance with an embodiment of the present invention.

FIG. 9B provides a finite element analysis showing the static and deformed positions of a closed curved beam 4 under fixed boundary conditions provided by constraining openings 6A and 6B. As mentioned above, the load is applied via a pin to opening 1 fabricated onto the spring layer. As depicted, the closed curved beams 4 are designed to substantially flatten as illustrated by the position of beam 4' under an externally applied load. The closed curved configuration, i.e., the single continuous curve, such as an arc, is suitable for large deflections while producing minimal stress on the structure. A slider 15 is inserted into the opening achieved by the elongation of closed curved beam 4 under a load applied to opening 1. A clearance 9 is maintained between the opened configuration illustrated by beam 4' and the inserted slider 15. Clearance 9 provides for slider placement tolerances and slider insertion margins to assure insertion of the slider 15 without interference. Upon release of the deformed closed beam 4' a preload is applied to the leading edge of the slider 15. The preload biases the slider 15 against the interconnect structure 20 assuring electrical contact between the slider and the slider test socket assembly. Slider 15 is inserted in the opening defined above socket pocket 3 and the curved beams 4 (see FIG. 7). The preload generated from the deflection of closed curved beams 4 urges the slider towards the flexible electrical interconnect 20.

Figure 9C:
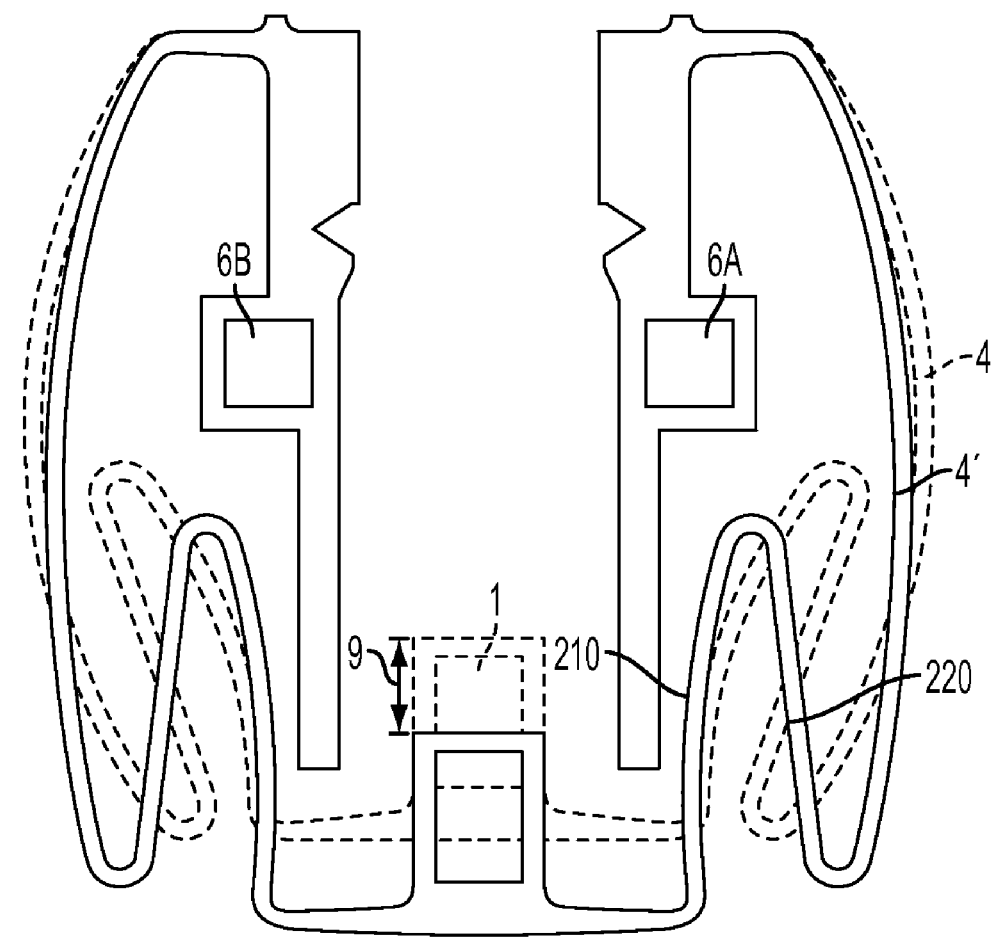
FIG. 9C is a top view of a finite element analysis for a flexible hinge connecting one end of a curved spring in order to provide a preload to the slider under zero load and under maximum deflection in accordance with an embodiment of the present invention.

FIG. 9C provides a finite element analysis of a curved flexure 4 with a single integrated flexible hinge 220 connected to a secondary curved flexure 210 in accordance with one embodiment of the invention. The super-imposition of the deformed and non deformed state flexures yields an opening clearance 9. The strategy of using a flexible hinge 220 allows the increase in the opening clearance 9 without an increase in the overall size of the socket. The flexible hinge 220 changes the boundary conditions at the end of the curved beam(s) 4 by allowing a rotational movement of the curved beam which in turn reduces the maximum stress compared to a curved beam with the same radius of curvature. The embodiment of FIG. 9C provides for main curved beam 4 to be attached at a fixed point of the slider test socket at one end and through the hinge and secondary curved beam at another end of the main curved beam.

Figure 9D:
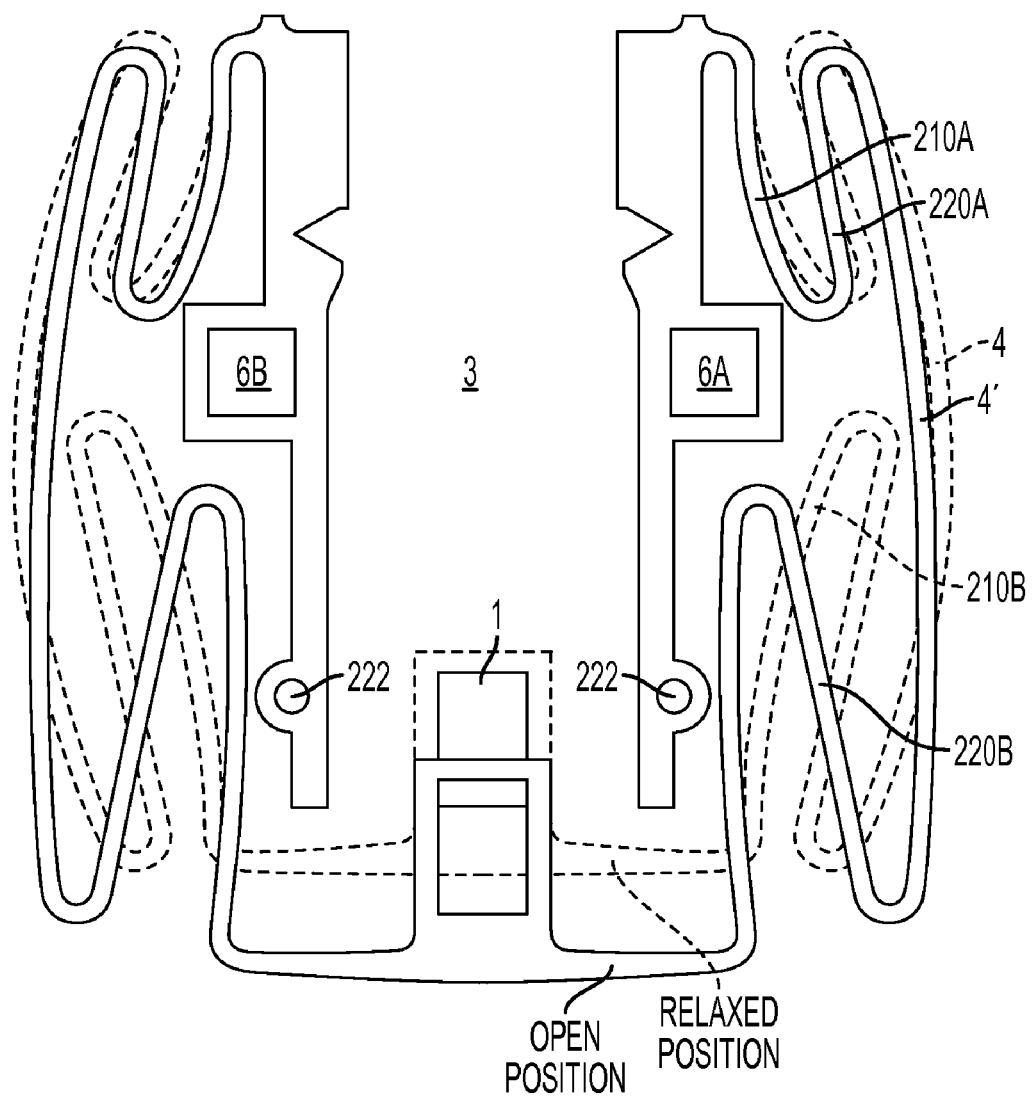
FIG. 9D provides a top view of a finite element analysis of a curved flexure with an integrated flexible hinge connected to each secondary curved flexure in accordance with one embodiment of the invention.

FIG. 9D provides a finite element analysis of a curved flexure with an integrated flexible hinge connected to each secondary curved flexure in accordance with one embodiment of the invention. Main curved beam 4 is illustrated in an open position while the extended position is illustrated by main curved beam 4'. Flexible hinges 220a and 220b allow main curved beam 4 to rotate or pivot around a center that is different than a radial center than the main curved beam. Thus, through the addition of the flexible hinges 220a and 220b, curved beam 4 has more freedom to deflect with less constraints imposed onto the curved beam. The elastic revolute hinges 220a and 220b join the opposing ends of main curved beam 4 with two secondary curved beam structures 210a and 210b. One end of secondary curved beam structure is ultimately coupled to socket pocket 3 either directly or through intermediate structures. The nonlinear modeling demonstrates that additional extension is added by the secondary curved beams of approximately 50 percent. In addition, the overall deflection is achieved by the secondary curved beams 210a and 210b, while the main curved beam 4 is exposed to minimal stress during the extension. One skilled in the art will appreciate that the flexible hinges 220a and 220b balance the stresses between the main curved beam 4 and secondary curved beams 210a and 210b to minimize the overall stress. Flexible hinges 220a and 220b decouple main curved beam 4 from the fixed ends and enable the main curved beam to deform and rotate analogous to a linkage. Furthermore, flexible hinges 220a and 220b decouple motion of main curved beam 4 and secondary beams 210a and 210b to enable movement of the main curved beam in two dimensions. Fiducials 222 provide a reference point for a vision system in accordance with one embodiment of the invention. It should be noted that the hinged structure is mirrored on the other side of the test socket as illustrated in FIG. 9B.

It should be appreciated that the embodiments of FIGS. 9C and 9D enable substantial relaxation of the constraint on the main curved beam by introducing a series of revolute elastic joints, i.e., hinges, at the extremities of the curved beams while preserving a single point of contact with the slider. The introduction of the elastic revolute joints, or hinges, enables introduction of additional curved elastic beams, i.e., the secondary curved beams, thereby increasing the effective length of the main curved elastic beam without increasing its overall dimension. Thus, the embodiments described herein allow a substantial increase in the clamp opening with minimal stress on the curved beam, while the elastic hinges experience very little stress. One skilled in the art will appreciate that revolute joints refer to joints that provide a single-axis rotation function for uni-axial rotation devices.

Figure 10:
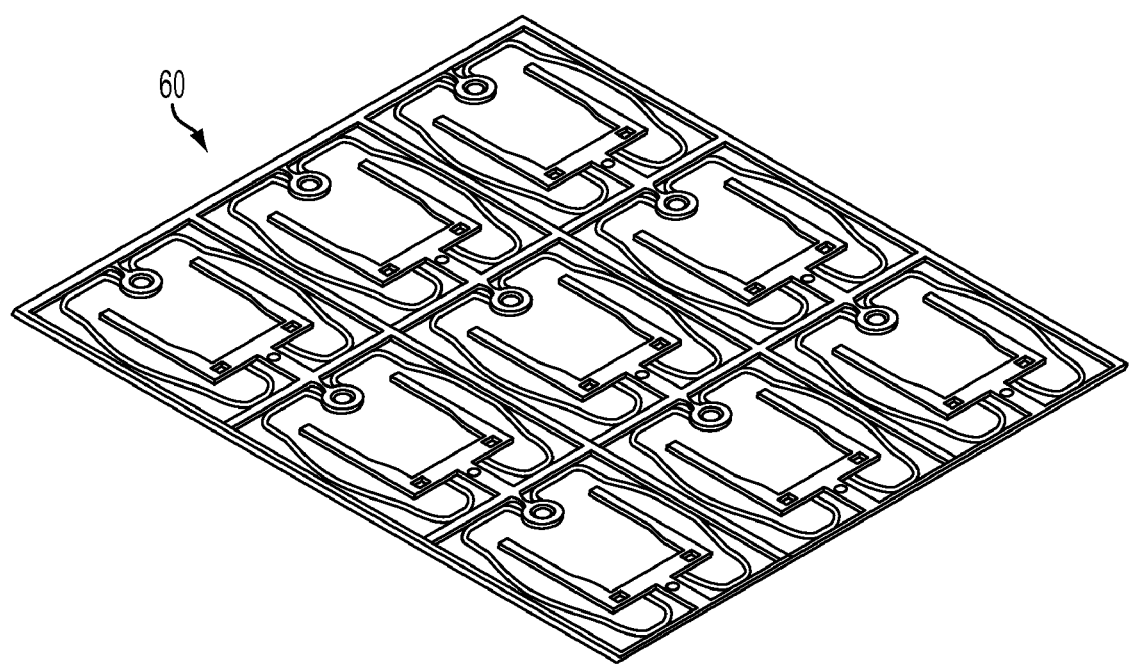
FIG. 10 is a schematic view of an etched layer of curved springs in accordance with an embodiment of the present invention.

FIG. 10 provides an etched metallic sheet 60 containing the closed curved spring layers under no load. Each component contained in the slider test socket can be fabricated in a sheet. The sheets are then stacked and adhered to form slider test sockets. The material utilized for the sheets may be Beryllium copper, Beryllium nickel, or stainless steel in one embodiment. However, it should be appreciated that other materials may be utilized for the slider test sockets as the exemplary materials are not meant to be limiting.

Figure 11:
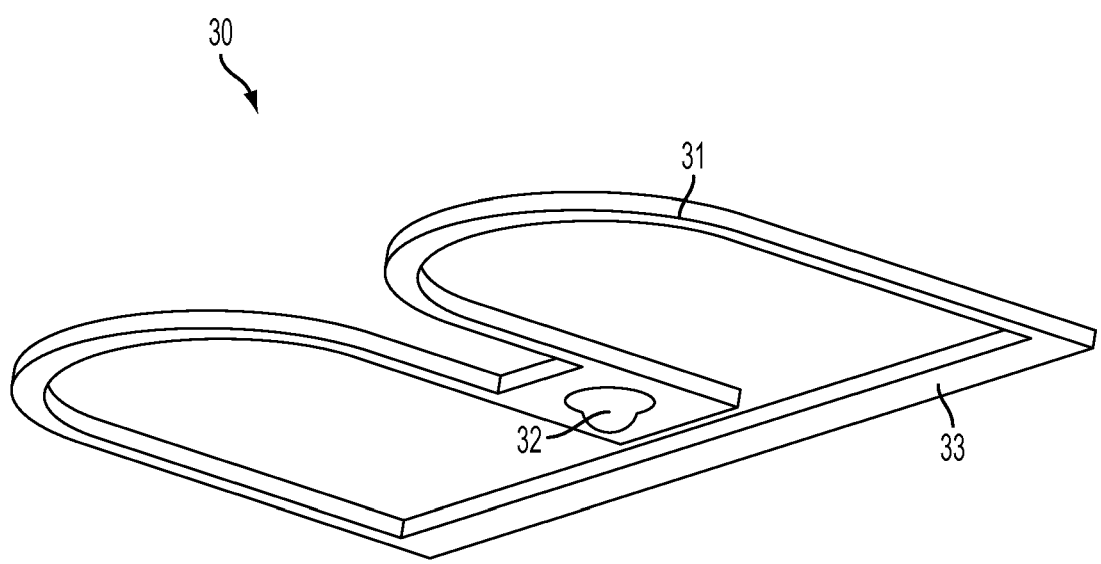
FIG. 11 is a schematic view of a gimbal in accordance with an embodiment of the present invention.

FIG. 11 provides a schematic of a gimbal 30 with gimballing struts 31, a dimple 32 for transferring the preload to the slider test socket, and an attachment feature 33 to the slider test socket. A maximum extension of the protrusion from the planar surface of gimbal 30 for dimple 32 matches the spacing established by the thickness of spacer layer 7 shown in FIG. 8A to allow for both preload transfer and gimballing. Matching the protrusion of dimple 32 to the spacer layer 7 allows for simultaneous preload transfer and gimballing without transferring the preload to the gimballing struts 31 and causing unwanted pitch and roll dynamic attitude. In contrast to the prior art, the dimple structure of the present embodiments is formed onto the gimbal to permit pitch and roll motion while a preload is applied without deforming the gimballing struts 31.

Figure 12:
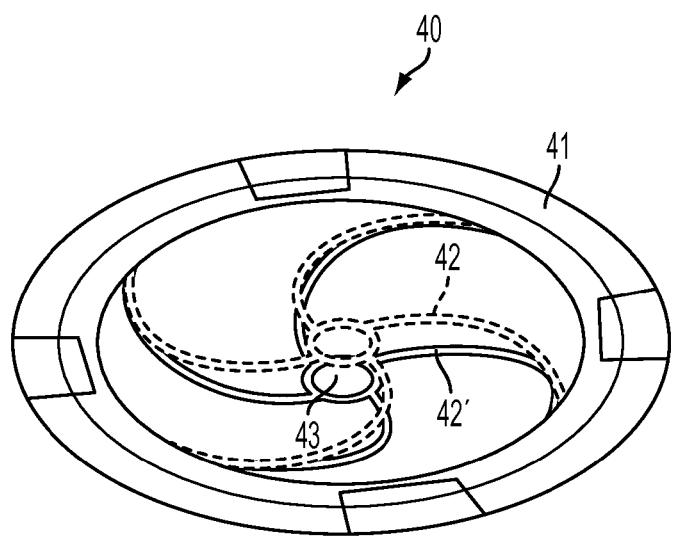
FIG. 12 shows a perspective view of the normal deflection of a preload in accordance with an embodiment of the present invention.
Figure 13:
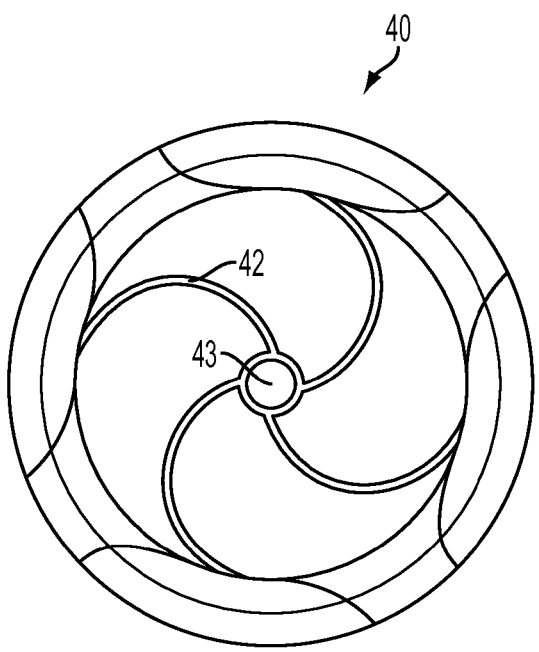
FIG. 13 shows a top view of the normal deflection of a preload in accordance with an embodiment of the present invention.

The preload stem 50 of FIG. 6 is attached to preload spring 40 shown in FIGS. 12 and 13 via opening 43. It is highly desirable to design a preload spring capable of normal deflection with minimal rotation so as not to cause off track motion of the slider during the electrical testing due to magnetic disk runnout. FIG. 12 shows a series of curvilinear springs 42 attached between a fixed outer edge 41 and a moving center structure 43 arranged to provide a large out of plane deformation with minimal rotation as shown in FIG. 13. The view from FIG. 12 is a perspective side view illustrating displacement in the z direction, while the view from FIG. 13 illustrates a top view along the z axis showing no other deflection in the x or y direction, i.e., the deflection is limited to one dimension that is in line with the load. The normal flexibility of the curvilinear preload spring 40 is critical to compensate for the magnetic disk run-out during the electrical test operation. In addition, limiting the displacement to the z direction while having no rotation or displacement if the x or y direction, while having the preload spring located further from the disk, as compared to the prior art, enables the present embodiments not to be effected by the vibration and wind generated from the rotation of the disk. In essence, the preload spring is decoupled from the suspension arm in the present embodiments.

Figure 14A:
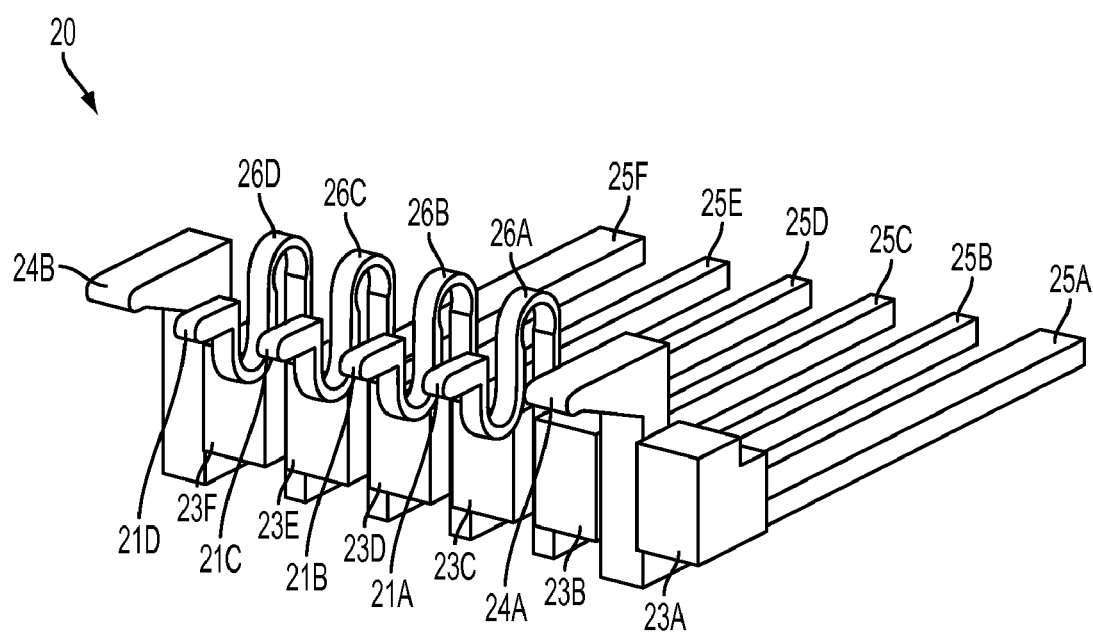
FIG. 14A is a schematic view of the interconnect assembly in accordance with an embodiment of the present invention.

FIG. 14A shows a series of 6 interconnects 21A-D and 24A-B spaced with insulators 23A-F. Two rigid interconnects 24A-B are disposed at the outer edges of interconnect assembly 20 and act as a datum for the slider and as a stop for the deflection of the flexible interconnects 21A-D. The electrical interconnects 25A-F extend beyond the outer edges of the slider test socket to form electrical connections with another interconnect (see FIGS. 18 and 19) via ball bonding, ball jetting, etc., or any other suitable technique. The flexible electrical interconnects 26A-D are deflected during contact with the slider trailing edge to provide intimate electrical contact. One skilled in the art will appreciate that any suitable conductive material may be used for interconnects 21A-D, 24A-B, and 25A-F, while any suitable insulative material may be used for insulators 23A-F. The electrical contacts are coated with palladium cobalt (PdCo), palladium nickel (PdNi), or gold (Au) in one embodiment.

Figure 14B:
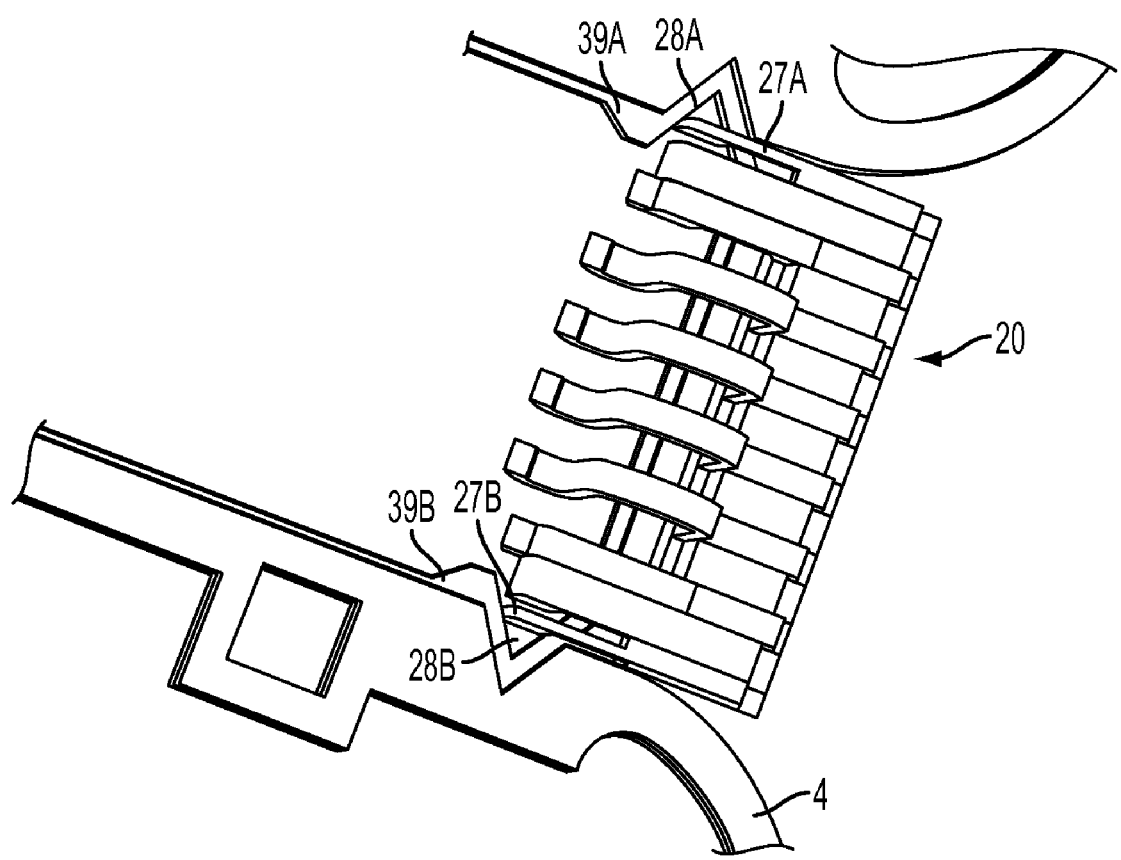
FIG. 14B is a schematic view of the interconnect assembly in accordance with an embodiment of the present invention.
Figure 16:
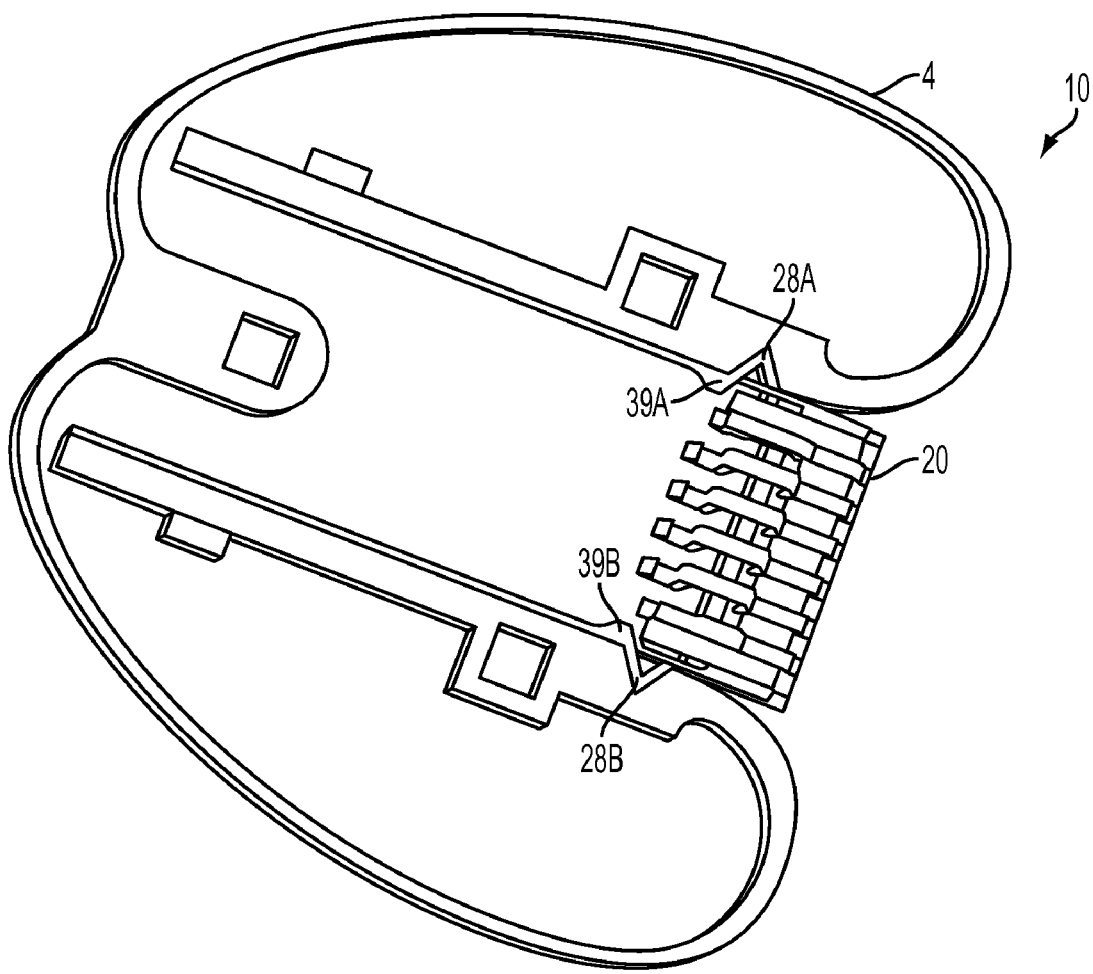
FIG. 16 is a schematic view of the slider test socket with the electrical interconnect assembled onto a standard suspension.

FIG. 14B illustrates a top view an interconnect assembly 20 inserted into the socket assembly 10 (see also FIGS. 6-8B) via a V-groove 28A and 28B etched into the spring assembly 4 (see also FIGS. 8B and 16). Flexible beams 27A and 27B are fabricated at opposite ends of the electrical interconnect assembly 20 to engage into the V-grooves 28A and 28B with an interference fit. The flexible beams 27A and 27B deform and cause self alignment of the electrical interconnect assembly 20 with respect to the slider bond pad locations. The slider is guided by ramp features 39A and 39B fabricated on the same layer as the V-grooves to reduce alignment tolerance stack ups, in one embodiment. One skilled in the art will appreciate that the embodiments are not limited to this type of interference fits as other types of fits are possible and this interference fit may even be optional.

Figure 15A:
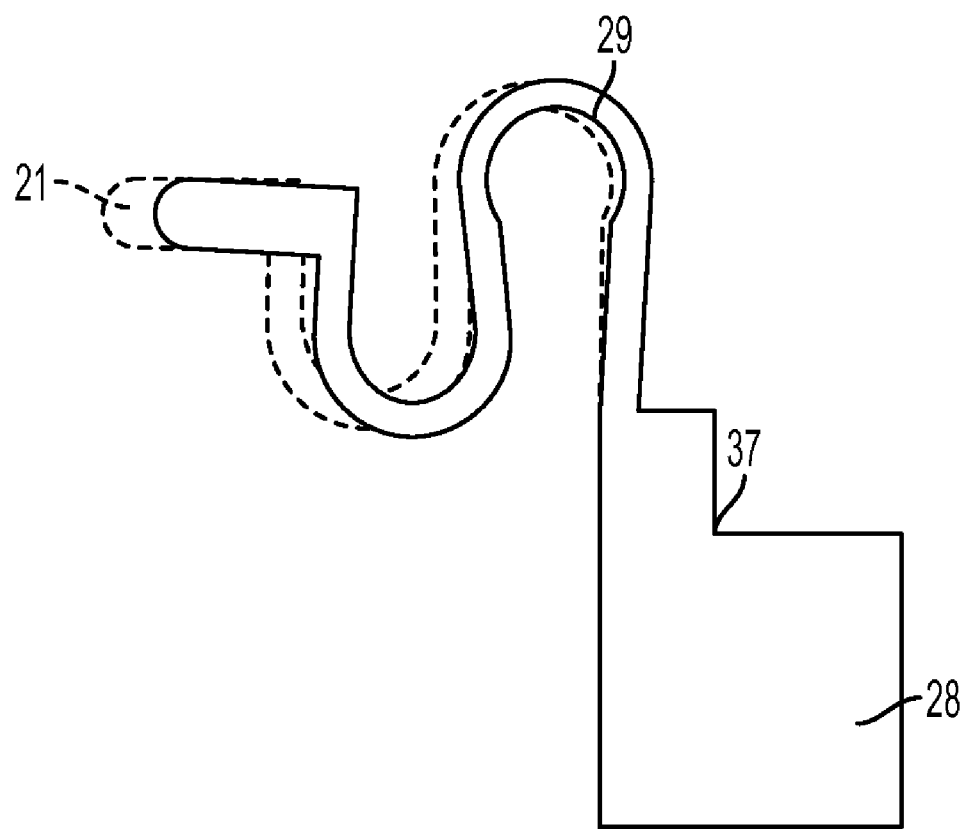
FIG. 15A is a schematic view of the static and deformed interconnect spring in accordance with an embodiment of the present invention.

FIG. 15A gives the design details of a flexible interconnection 21 by superimposing the static and deformed shapes of the flexible interconnection under loading conditions. Spring 29 deflects under slider contact to move substantially in the same direction as the load. Feature 28 attaches to insulator layer 23 (See FIG. 14A. Feature 27 provides a datum for assembly to the slider test socket.

Figure 15B:
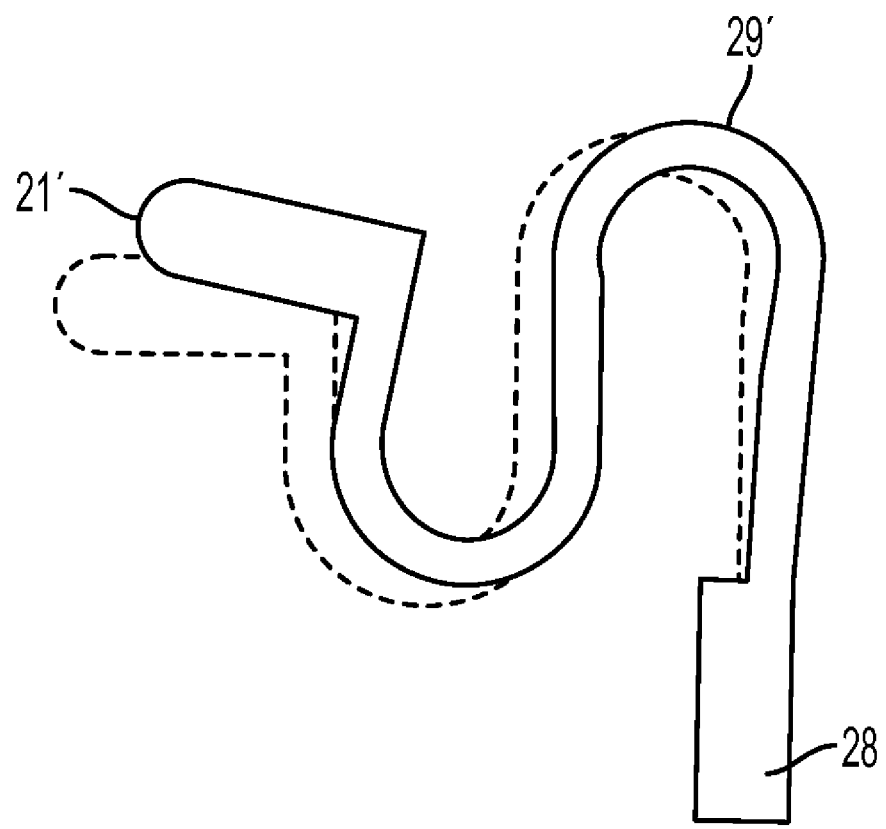
FIG. 15B is a schematic view of the static and deformed interconnect spring in accordance with an embodiment of the present invention.

FIG. 15B gives the design details of a flexible interconnection 21' by superimposing the static and deformed shapes of the flexible interconnection under loading conditions. Spring 29' deflects under slider contact to move in a different direction than the applied load by the slider to expose new areas of the slider electrical contacts. In either of the embodiments of FIG. 15A or 15B, the contact portion of interconnection 21 may be coated with (PdCo), PdNi, or Au in order to prolong the life of the interface.

FIG. 16 depicts the electrical interconnect 20 assembled into the slider test socket 10. As illustrated, one end of the curved beam 4 is ultimately coupled to the socket pocket as illustrated in FIGS. 7 and 8A. Returning to FIG. 16, the other end of the curved beam 4 is coupled to the extension that places a contact force onto the leading edge of a slider disposed within the test socket 10. It should be appreciated that the embodiment with the hinges and primary and secondary curved beams of FIGS. 9C and 9D in place of the embodiment for the curved beams illustrated in FIG. 16.

Figure 17:
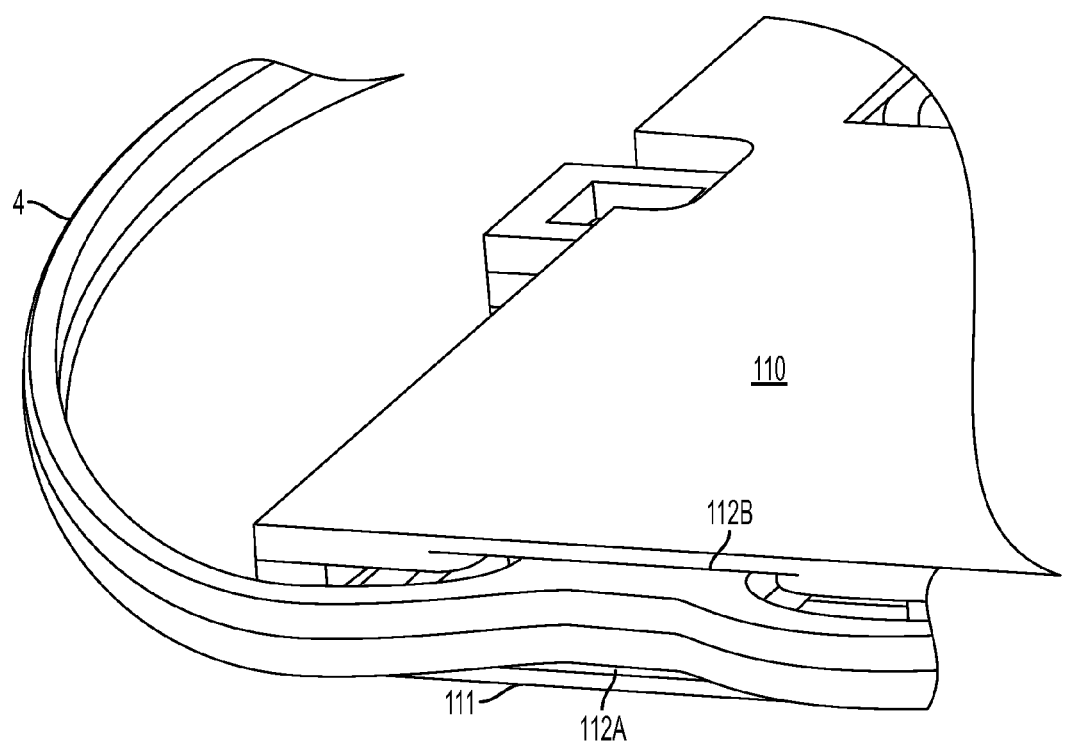
FIG. 17 is a schematic view of the slider test socket with displacement limiters etched in the top and bottom in accordance with an embodiment of the present invention.

FIG. 17 shows the leading edge of the test socket with the top and bottom plate sandwiching the curved beams. Top and bottom gaps 112A and 112B are formed between the top and bottom plates 110 and 111 to allow the flexible curved beams to deform in order to clamp the slider in position while preventing the flexible curved beams 4' and 4" from deforming out of plane due to external forces, as discussed above with reference to FIG. 8B.

Figure 18:
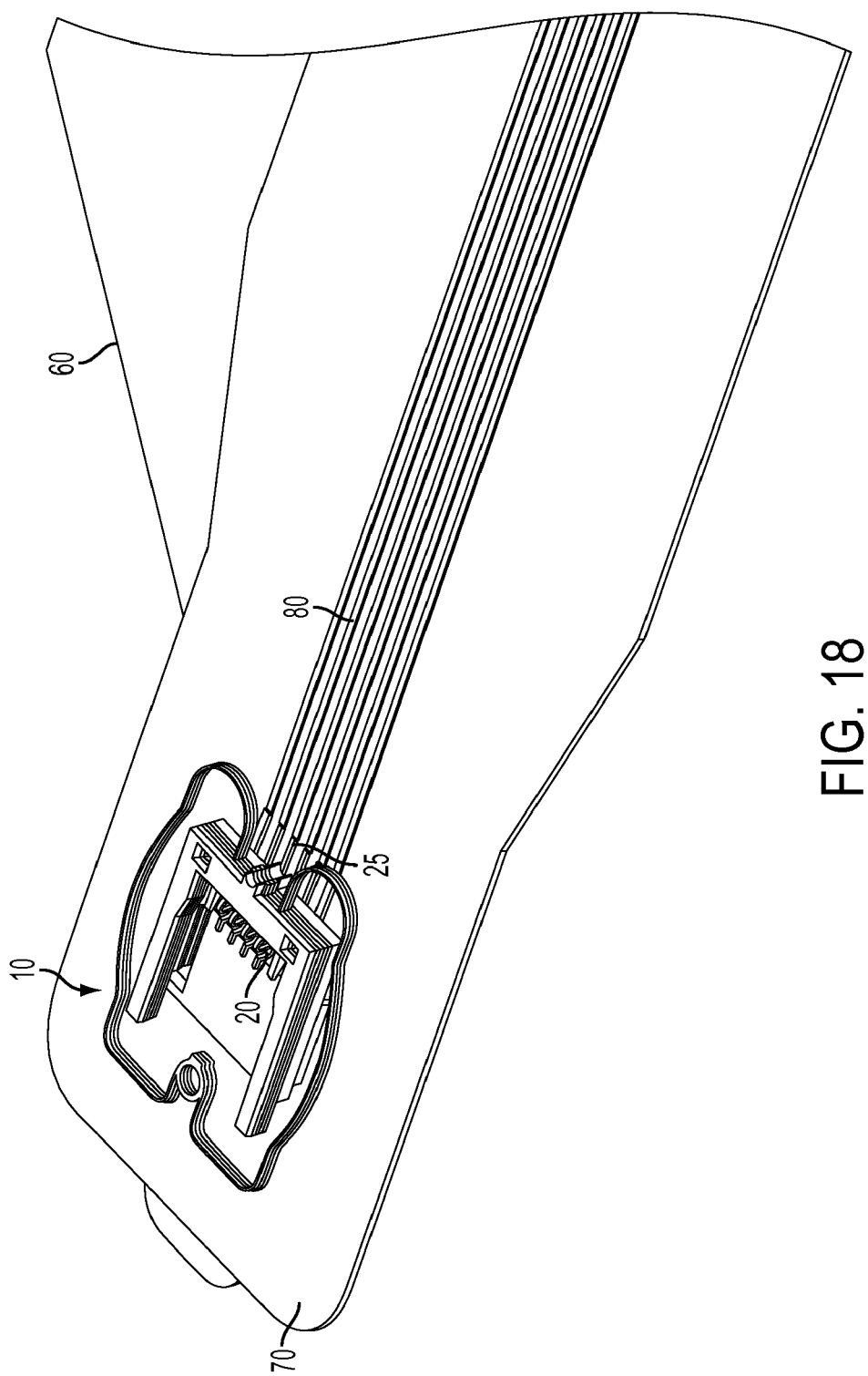
FIG. 18 is a schematic closed up view of the slider test socket with the electrical interconnect assembled onto a standard suspension.

FIG. 18 shows a slider test socket assembly 10 with a flexible electrical interconnect assembly 20 assembled onto a suspension 60. First, the socket assembly is attached to the suspension gimbal 70 via a bonding operation. The electrical interconnect extensions 25 are aligned with the suspension electrical interconnect 80 of the interconnect assembly 20 for solder joining during the assembly process. Suspension (60) is available commercially and well known in the art. It should be appreciated that in this embodiment, the socket assembly is combined with an existing suspension as opposed to preload spring 40 of FIG. 6.

Figure 19:
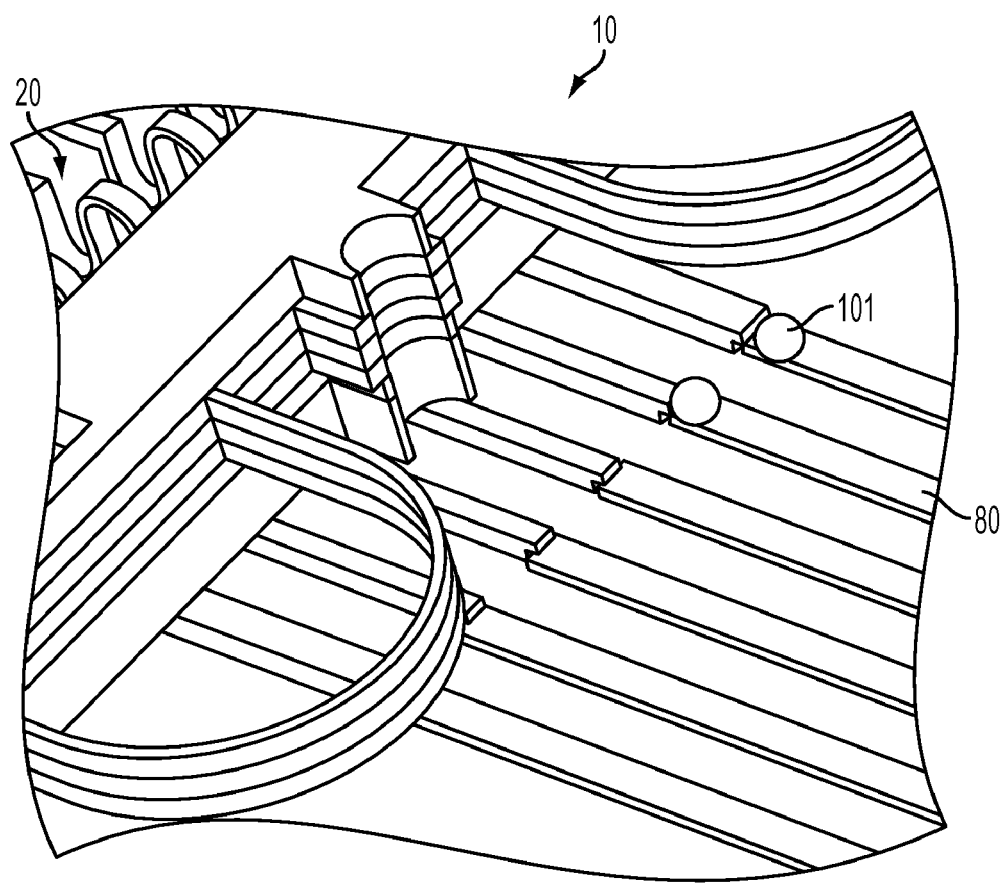
FIG. 19 is a schematic closed up view of the slider test socket with the electrical interconnect assembly in accordance with an embodiment of the present invention.

FIG. 19 provides a close up view of the attachment between the slider test socket 10 with the flexible interconnect 20 and the gimbal interconnect 80. Solder balls 101 are dispensed onto the junction between the flexible interconnect extensions and the gimbal flex leads 80. It should be appreciated that FIG. 19 illustrates one attachment technique and is not meant to be limiting as any known attachment techniques may be applied to the embodiments described herein.

Where a range of values is provided, it is understood that each intervening value, to the tenth of the unit of the lower limit unless the context clearly dictates otherwise, between the upper and lower limit of that range and any other stated or intervening value in that stated range is encompassed within the inventions. The upper and lower limits of these smaller ranges which may independently be included in the smaller ranges is also encompassed within the inventions, subject to any specifically excluded limit in the stated range. Where the stated range includes one or both of the limits, ranges excluding either both of those included limits are also included in the inventions.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present inventions are not entitled to antedate such publication by virtue of prior invention. Further, the dates of publication provided may be different from the actual publication dates which may need to be independently confirmed.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A head suspension assembly for a slider tester, comprising:
    a load stem having a first end affixed to a preload spring assembly;
    a gimbal assembly affixed to a second end of the load stem;
    a socket coupled to the gimbal assembly, the socket adapted to releasably secure a slider through a closed curved spring beam wherein a surface of a dimple of the gimbal assembly transfers a preload from the load stem to a surface of the socket; and
    an electrical interconnect adapted to couple to the slider when the slider is secured in the socket.

2. The apparatus of claim 1 wherein the electrical interconnect includes flexible electrical contacts coated with palladium cobalt that electrically couple the slider to electrical conductors, the electrical conductors electrically couple signals from remote circuitry to and from the slider when the slider is secured in the socket.

3. The apparatus of claim 1 wherein the socket includes a contact region formed on the closed curved spring beam and wherein the contact region biases the slider against the flexible electrical interconnect.

4. The apparatus of claim 3 wherein the socket includes a plurality of closed curved beam springs in a stacked configuration, the plurality of closed curved beam springs configured to apply a preload onto the slider.

5. The apparatus of claim 1 wherein the socket includes openings to constrain movement the socket during the slider insertion and release.

6. The apparatus of claim 1 wherein the socket includes locating features for pinning the socket to a fixture plate for loading and unloading the slider.

7. The apparatus of claim 1, wherein the closed curved spring beam is shaped so that a middle part is convex to provide flexibility under load and wherein the closed curved spring beam has a single curve.

8. The apparatus of claim 1, wherein the preload spring assembly is limited to deflection in a single dimension.

9. A head suspension assembly for a slider tester, comprising:
    a suspension load beam assembly including a load beam and a gimbal;
    a socket coupled to the gimbal, the socket adapted to releasably secure a slider with a closed curved spring beam; and
    an electrical interconnect adapted to couple to the slider when the slider is secured in the socket.

10. The apparatus of claim 9 wherein the electrical interconnect includes flexible electrical contacts that electrically couple the slider to electrical conductors, the electrical conductors electrically couple signals from remote circuitry to and from the slider when the slider is secured in the socket.

11. The apparatus of claim 9 wherein the socket includes a contact region formed on the closed curved spring beam and wherein the contact region urges the slider against the flexible electrical interconnect.

12. The apparatus of claim 9 wherein the socket includes a plurality of closed curved beam springs in a stacked configuration, the plurality of closed curved beam springs configured to apply a preload onto the slider.

13. The apparatus of claim 9 wherein the socket includes openings to constrain the socket during the slider insertion and release.

14. The apparatus of claim 9, wherein the closed curved spring beam extends around a periphery of at least three sides of the slider and wherein the closed curved spring beam has a single continuous curve in a form of an arc.

15. A method of making a head suspension assembly for a slider tester, comprising:
    providing a load stem attached to a preload spring assembly;
    providing an electrical interconnect;
    providing a socket with a closed curved spring adapted to releasably secure a slider and to electrically couple the electrical interconnect to the slider;
    coupling the socket to the load stem assembly; and
    attaching the electrical interconnect to the head suspension assembly such that the electrical interconnect is electrically coupled to the socket.

16. The method of claim 15 wherein the socket is formed by an etching fabrication process.

17. The method of claim 15 wherein the socket is formed by a plating fabrication process.

18. A method of making a head suspension assembly for a slider tester, comprising:
    providing a load beam assembly;
    providing an electrical interconnect;
    providing a socket with a closed curved spring to releasably secure a slider and to electrically couple the electrical interconnect to the slider;
    coupling the socket to the load beam assembly; and
    attaching the electrical interconnect to the head suspension assembly such that the electrical interconnect is electrically coupled to the socket.

19. The method of claim 18 wherein the socket is formed by an etching fabrication process.

20. The method of claim 18 wherein the socket is formed by a plating fabrication process.

21. An assembly for a slider tester, comprising,
    a socket coupled to a gimbal assembly, the socket configured to releasably secure a slider through a closed curved beam extending around a periphery of a side of a socket pocket configured to support the slider, one end of the closed curved beam coupled to a first end of an elastic hinge, a second end of the elastic hinge coupled to a first end of a secondary curved beam, a second end of the closed curved beam affixed to an extension, the elastic hinge decoupling motion of the closed curved beam and the secondary curved beam.

22. The assembly of claim 21, wherein a radius of the closed curved beam extends toward the socket pocket and wherein a radius of the secondary curved beam extends away from the socket pocket.

23. The assembly of claim 21, wherein the assembly includes another closed curved beam coupled to another elastic hinge, which in turn is coupled to another secondary curved beam, the another secondary curved beam affixed to the extension.

24. The assembly of claim 21, wherein the other end of the closed curved beam is coupled to another elastic hinge.

25. The assembly of claim 23, wherein the other elastic hinge is coupled to another secondary curved beam, the other secondary curved beam having an end coupled to the socket pocket.

* * * * *